United States Patent [19]

Nakamoto et al.

[11] 4,074,292
[45] Feb. 14, 1978

[54] SYSTEM FOR INDICATING PHOTOGRAPHIC INFORMATION

[75] Inventors: Soichi Nakamoto, Machida; Tadashi Ito; Fumio Ito, both of Yokohama; Yasuo Isobe, Kawasaki, all of Japan

[73] Assignee: Canon Kabushiki Kaisha, Tokyo, Japan

[21] Appl. No.: 678,033

[22] Filed: Apr. 19, 1976

Related U.S. Application Data

[63] Continuation of Ser. No. 437,621, Jan. 29, 1974, abandoned.

[30] Foreign Application Priority Data

Feb. 6, 1973   Japan ............................ 48-15014
Feb. 6, 1973   Japan ............................ 48-15015

[51] Int. Cl.² ..................... G03B 17/20; G03B 7/00
[52] U.S. Cl. ............................. 354/53; 354/60 L; 340/324 R
[58] Field of Search ............... 354/23 D, 53–57, 354/60 L, 289; 340/228 S, 324 R, 366 R, 372, 378 R, 378 A, 378 B, 381; 356/219, 222, 226, 227; 250/214 P; 116/114 J; 40/130 N, 130 R

[56] References Cited

U.S. PATENT DOCUMENTS 2,945,313  7/1960  Hardesty ................. 340/366 R X
3,798,662  3/1974  Suzuki ...................... 95/10 CT Primary Examiner—L. T. Hix
Assistant Examiner—William B. Perkey
Attorney, Agent, or Firm—Fitzpatrick, Cella, Harper & Scinto

[57] ABSTRACT

A system for indicating photographic information which includes a circuit for converting an optical signal into an electrical signal. Comparing elements are provided for comparing the electrical signal with one of a plurality of reference signals having different levels, and electrical elements serve to produce an indication signal responsive to the output from one of the comparing elements. A plurality of luminescent components are connected to the signal producing element for turning-on in response to an indication signal. A plurality of indicating segments indicate the photographic information which the luminescent elements irradiate, the number of indicating segments being less than the number of luminescent elements and at least one of the indicating elements is selectively illuminated by more than one of the luminescent elements. The indicating segments have different colors to indicate different kinds of photographic information, whereby one indicating segment is capable of indicating two different modes of operation of the system.

3 Claims, 6 Drawing Figures

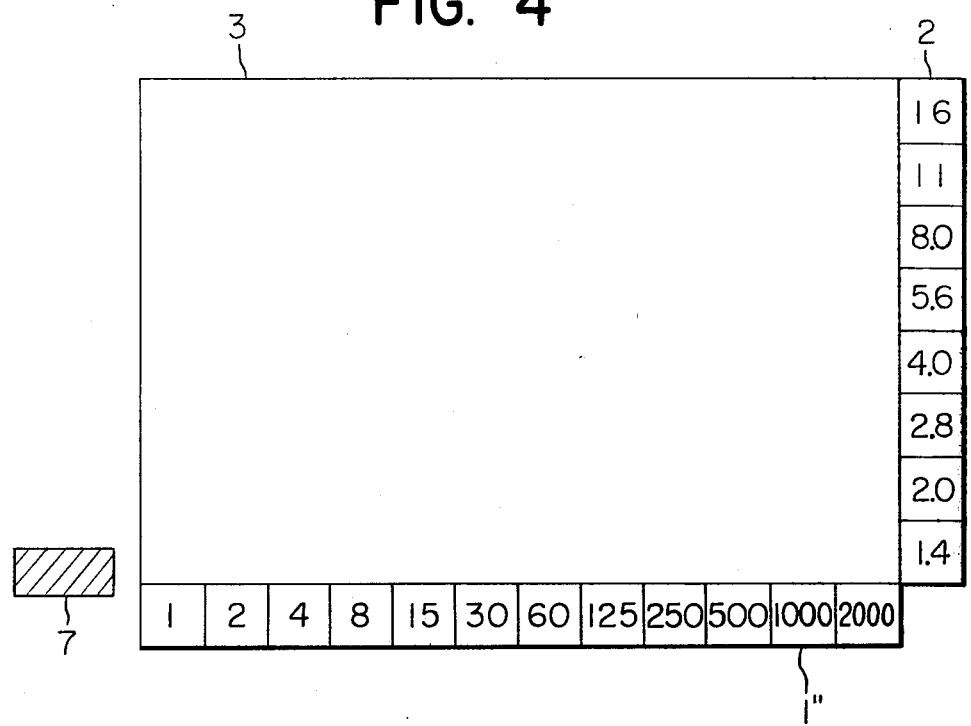
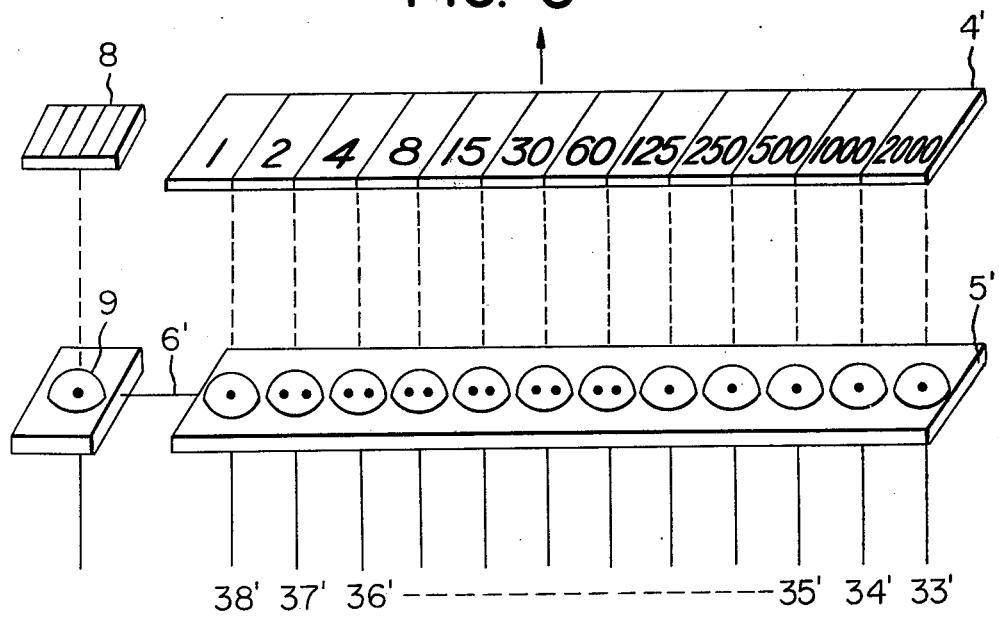

SYSTEM FOR INDICATING PHOTOGRAPHIC INFORMATION

This is a continuation of application Ser. No. 437,621 filed Jan. 29, 1974, now abandoned.

BACKGROUND OF THE INVENTION

1. Field of the Invention

This invention relates to systems for indicating various photographic information in cameras and the like, and more particularly to a system for indicating information such as the shutter speed in the finder.

2. Description of the Prior Art

In cameras provided with an electric shutter, there is employed for pactical use a method for providing indications to predict shutter speed within the finder. Such indication methods include a method in which values of photographic information are arranged in a row on one side of the field of view of the finder, said values being indicated by a pointer, and a method for selectively illuminating one of said values by a lamp. In recent electric shutter cameras, there is employed for practical use a method for illuminating one place (a lot number) of values of photographic information with the use of luminescent diodes (LED). However, in the case of cameras having from ultralow shutter speed to ultrahigh shutter speed, such as, for example, when 18 stages of indications are required to indicate the shutter speed from 60 seconds to 1/2000 seconds in a multiple order, it is hard to accommodate them on one side of the finder in a conventional manner so that two sides must be used, which becomes confusing.

SUMMARY OF THE INVENTION

An object of this invention is to provide a system for indicating a wide range of photographic information, particularly shutter speed, in a fixed space within the finder. A feature of the invention resides in the provision of a photographic information indicating system for cameras, etc. provided with a series of photographic information indicating lot numbers, characterized in that a plurality of indication signals are entered into at least a part of a single lot number of said indicating lot numbers so that the indicative content of said part is made in dual form.

Certain specific embodiments of the invention will now be described with reference to the accompanying drawing.

BRIEF DESCRIPTION OF THE DRAWINGS

FIG. 4 shows a field of view of another finder of the invention;

FIG. 5 shows a perspective view showing a portion wherein the shutter speeds are indicated.

DESCRIPTION OFF THE PREFERRED EMBODIMENTS

Figure 1:
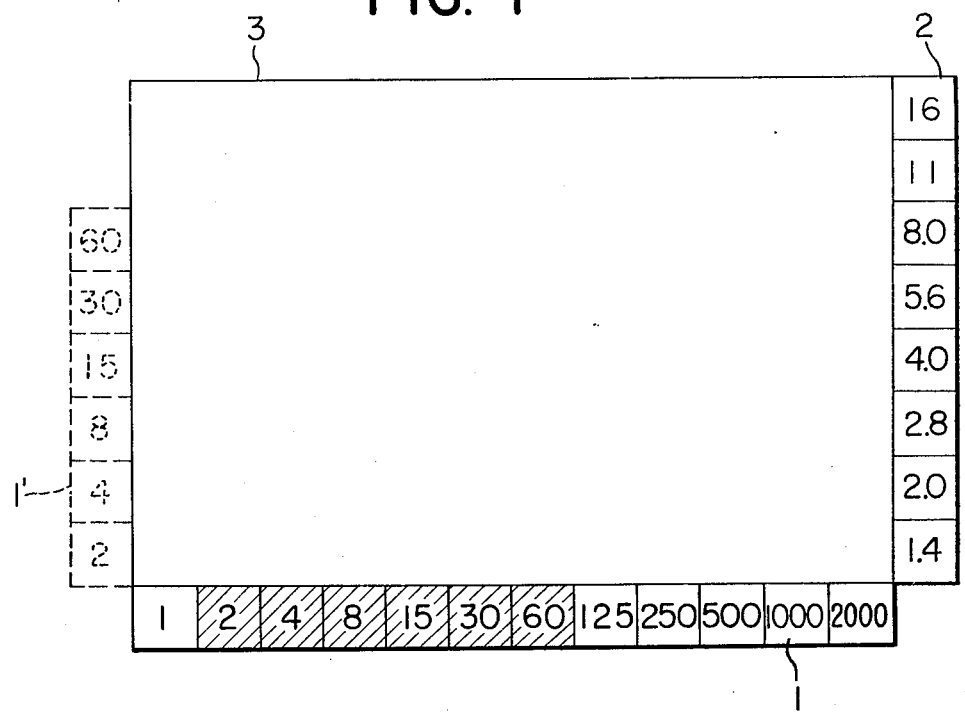
FIG. 1 illustrates a field of view of the finder using a photographic information indicating system in accordance with the present invention.
Figure 2:
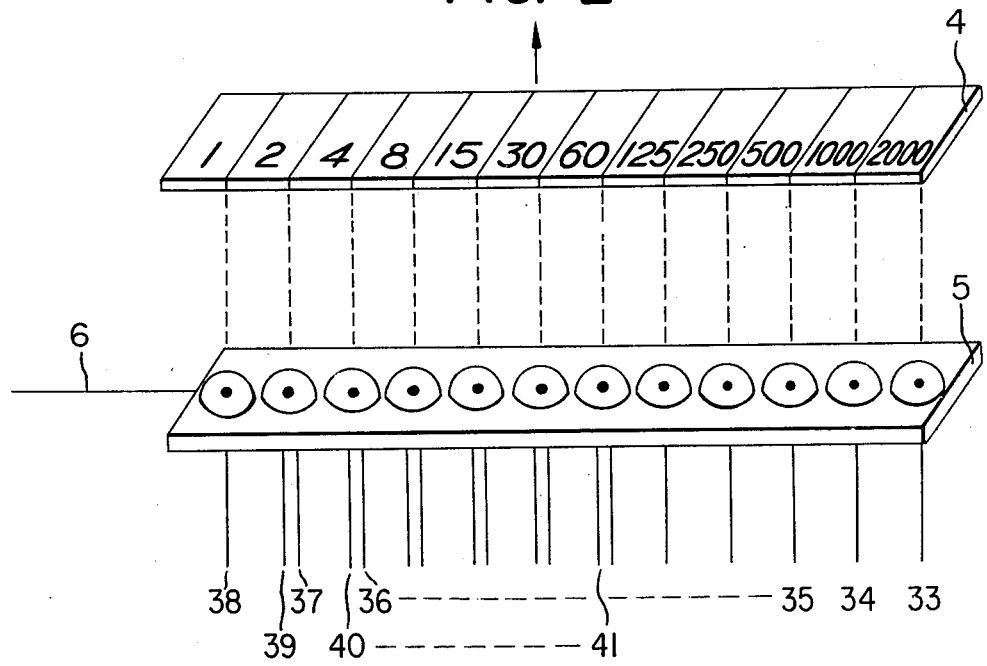
FIG. 2 is a perspective view showing the construction of a portion wherein shutter speeds are indicated.
Figure 3:
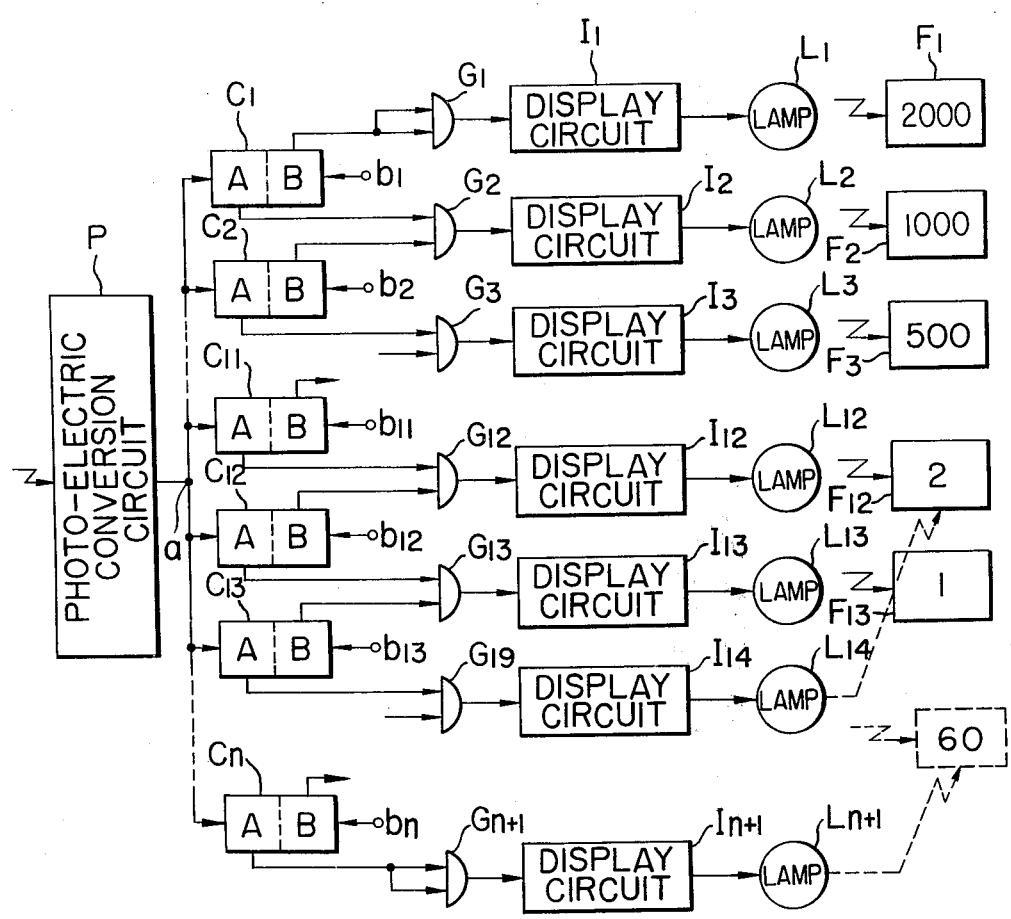
FIG. 3 is a block diagram showing one embodiment of the indicating system of the invention.

In the embodiment shown in FIGS. 1, 2 and 3, for example, a lamp or the like, having two pellets, different in color, incorporated within a single case as one kind of luminescent diode, is used to indicate low shutter speed and high shutter speed in the same lot number by way of color discrimination. For example, $\frac{1}{2}$ second and 2 seconds are indicated by the lot number indication of "2", one of which is illuminated by the green luminescent diode and the other of which is illuminated by the red luminescent diode so as to discriminate them from each other. In the drawing, there is shown a lot number 1 for the shutter speed, which is shown by the values from one second to 1/2000 of a second along one side of the finder. An example of a lot number for low shutter speed is shown at 1' utilizing a conventional system. An aperture indication is shown, as at 2, and a frame of a finder image plane is shown at 3. The shaded portion of the lot number 1 designates lot numbers in which the plural indications according to the invention are provided, the range from 2 to 60 is being indicated by color discrimination. According to the prior art system, the indication, from 60 seconds to 2 seconds, must be provided on a side different from that of the lot number from one second to 1/2000 of a second as shown in the drawing, or it must be arranged on one side by using smaller values in an individual lot number, and therefore, the use either method presents the disadvantage of being confusing.

In accordance with the present invention, for example, the indication from one second to 1/2000 of a second is provided by the green lamps while the indication from 2 seconds to 60 seconds is provided by the red lamps, which also serves for the indication of the lot number from 1/2 second to 1/60 second, at high speed.

In FIG. 2, there is shown an indicating portion of the system comprising a transparent film 4 having the shutter speeds printed thereon, a base plate 5 having a group of luminescent elements (e.g. LED) embedded therein, and a conductor 6 common to the luminescent elements. Further, leads 33–38 for green luminescent elements and leads 39–41 for red luminescent element are shown, and elements associated with the leads 37 and 39, and elements associated with the leads 36 and 40 are arranged in one lot number, respectively. Accordingly, for example, if "15" is lighted in green, the shutter speed indicates 1/15 second, and if it is lighted in red, the shutter speed indicates 15 seconds. In FIG. 3, there is shown a block diagram of the invention system comprising a photoelectric conversion circuit P, comparison circuits C1–Cn, each of which comprises 2 portion A to which is applied an output of the photoelectric conversion circuit, and a portion B to which is applied a reference voltage, reference voltages different in level being applied to terminals $b_1$–$b_n$ in order. Further, the system includes AND gate circuits $G_1$–$G_{n+1}$, to which two outputs of adjacent comparison circuits are applied. Indication circuits are shown as at $I_1$–$I_{n+a}$, and indication lamps are shown as at $L_1$–$L_{4+1}$, which are, for example, composed of luminescent diodes or light-emitting diodes (LED). Indication windows are shown as at $F_1$, $F_2$, $F_3$..., lot numbers (shutter speeds) being printed on films or the like. In operation, the voltage Va is applied to the portions A in the comparison circuits C from the photoelectric conversion circuit P. Reference voltages $Vb_1$–$Vb_n$ each being different in level, are applied to the portions B in the circuits C in a stepwise manner. When the voltage Va from the circuit P is higher than the voltage $Vb_2$ but lower than the voltage $Vb_1$, the portion A is turned on and the portion B is turned off in the circuit $C_1$, while the portions A are turned off and the portions B are turned on in all of the other circuits C. Consequently, only the gate $G_2$ of the AND gates is turned on, whereby its output passes into the indication circuit $I_2$ to cause the indication lamp $L_2$ to be turned on. Accordingly, the luminescence of the lamp $L_2$ is projected in the window $F_2$ to indicate a shutter speed of 1000, that is, 1/1000 second. Next, presuming that the output Va from the circuit P has a relationship of $Vb_{12} < Va < Vb_{11}$, then both the portion A in the circuit $C_{11}$ and the portion B in the circuit $C_{12}$ are turned on to thereby turn on the gate $G_{12}$ and the lamp $L_{12}$ is lighted to project the indication "2" in the window $F_{12}$. Then, when the output Va has a relationship of $Vb_{14} < Va < Vb_{13}$, the gate $G_{14}$ is similarly turned on to light the lamp $L_{14}$. In the present embodiment, lamps $L_{12}$ and $L_{14}$ are formed by luminescent diodes combined in the same pellet, the lamps $L_{14}$ et seg. being lighted in red and the lamps $L_1 - L_{13}$ being lighted in green. Therefore, the lot number "2" in the window $F_{12}$ is projected by the lamp $L_{14}$, but in this case the projection is made in red. Further, it can be accurately discriminated that, since the projection by the lamp $L_{12}$ is made in green, the green indicates ½ second and the red indicates 2 seconds, even when the same lot number "2" is indicated. In a similar manner, when the voltage from the circuit P becomes less than the voltage $Vb_n$, the portion A in the circuit Cn is turned on and the gate $G_{n+1}$ is turned on to light the lamp $L_{n+1}$, and the lot number "60" is projected in red to indicate that the shutter speed is 60 seconds.

As described above, in accordance with the present embodiment, the indication content of a single lot number, that is, 60 -2 may be made in a dual form of indications such as 1/60 – ½ and 60 seconds –2 seconds by projecting for example, 60 -2 in the window by way of the combined LED of green and red lights.

Figure 6:
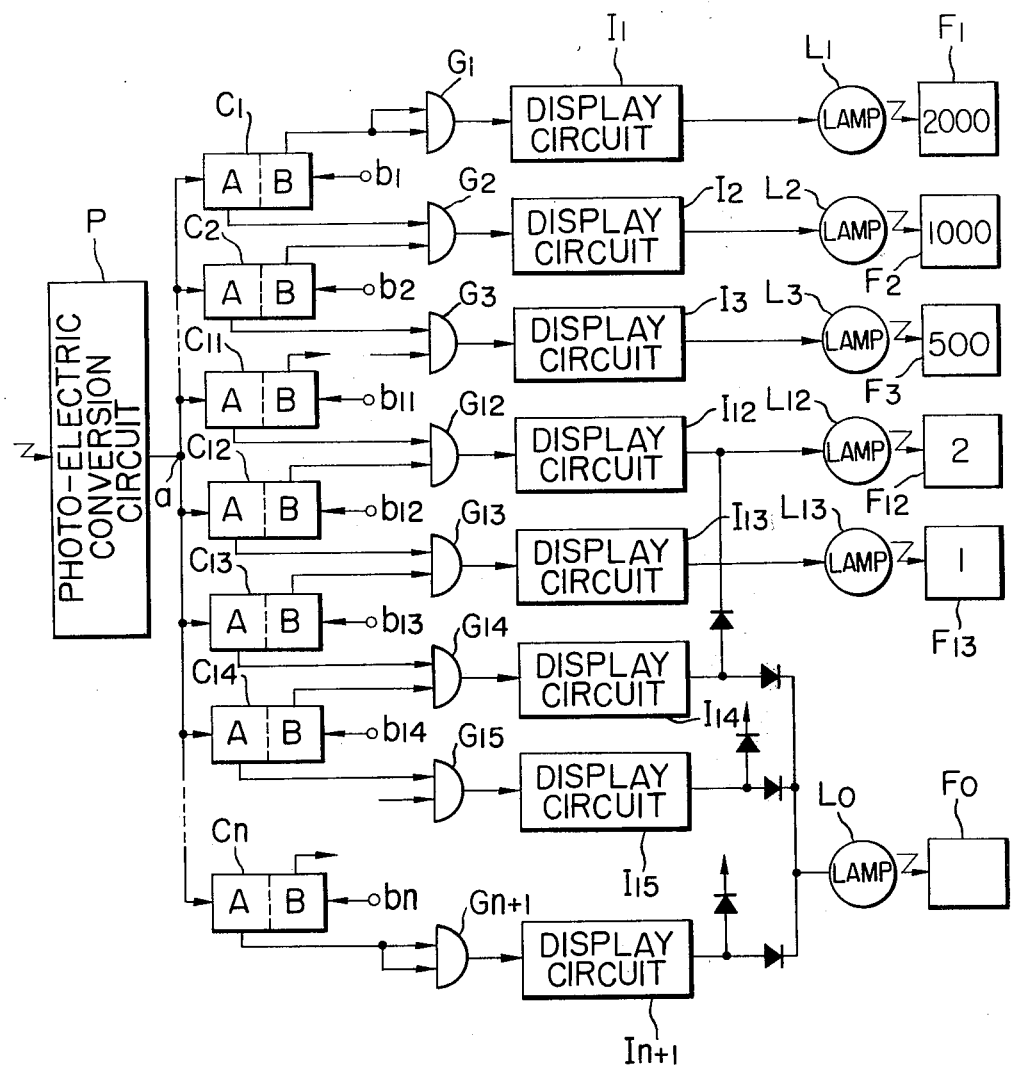
FIG. 6 shows a block diagram of another embodiment of the present invention.

In the second embodiment, as shown in FIGS. 4 to 6, a plurality of indication signals are entered in a single lot number, and an overflow indication is separately provided so as to enable one to discriminate the indication contents by said indication. That is, an overflow indication is provided in addition to a lot number 1 inch from 1 to 2000 as shown in FIG. 4 so that on-and-off indication may be performed by means of, for example, a red lamp. Thus, when the shutter speeds are from 2 seconds to 60 seconds, the indication lamp 7 goes on and one of said lot numbers "2" . . . "6" is projected by the lamp to indicate the shutter speed.

FIG. 5 is a perspective view illustrating one embodiment of the indication portion for the shutter speed, in which a reference numeral 4' designates a film having values of the shutter speed printed thereon, 5' a base plate having a group of luminescent elements embedded therein, and 6' a conductor common to said luminescent elements. An overflow indication window is shown at 8, in which a red indication may be obtained, for example, by means of a red filter. The system includes a luminescent element 9 for overflow. A diode (LED), indicative of two-colors, may be used for the luminescent element 9 to indicate a high speed, up to one second, in green light and to indicate a low speed, more than 2 seconds, in red light.

FIG. 6 is a block diagram of one embodiment of the present photographic information indicating system. In the figure, the system comprises a photoelectric conversion circuit P, comparison circuits $C_1 - C_n$, each of which comprises a portion A to which is applied an output of the photoelectric conversion circuit, and a portion B to which is applied a reference voltage, reference voltages each different in level, being applied into terminals $b_1 - b_n$ in order. Further, the system includes AND gate circuits $G_1 - G_{n+1}$, to which two outputs of adjacent comparison circuits are applied, indication circuits $I_1 - I_{n+1}$, and indication lamps $L_1 - L_{n+1}$, which are for example in the form of a luminescent diode (LED). Indication windows $F_1$, $F_2$, $F_3$ . . . are shown and shutter speeds (lot numbers) are printed on films, or the like. The system further includes an overflow indicating lamp $L_0$ and its indication window $F_0$.

In operation, the voltage Va is applied to the portions A in the comparison circuits C from the photoelectric conversion circuit P. Reference voltages $Vb_1 - Vb_n$ each being different in level, are applied to the portions B in the circuits C. When the input Va from the circuit P is higher than the voltage $Vb_2$ but lower than the voltage $Vb_1$, the portion A is turned on and the portion B is turned off in the circuit $C_1$, while the portions A are turned off and the portions B are turned on in all of the other circuits C. Consequently, the gate $G_2$ of the AND gates is opened to signals from the circuits $C_1$ and $C_2$, whereby its output passes into the indication circuit $I_2$ to light the indication lamp $L_2$. Thus, the value "1000" in the window $F_2$ is projected to indicate that the shutter speed is 1/1000 second. Next, presuming that the voltage Va from the circuit P is in the relationship of $Vb_{12} < Va < Vb, Vb_{11}$, the gate $G_{12}$ is turned on and the light $L_{12}$ is lightened to project the value "2"of in the window $F_{12}$. This indicates that the shutter speed is ½ second. Then, when the voltage Va is in the relationship of $Vb_{14} < Va < Vb_{13}$, the gate $G_{14}$ is turned on and the output of $L_{14}$ flows into the light $L_{12}$ through the diode and at the same time also flows into the overflow lamp $L_0$. Accordingly, the value "2" is projected in the window $F_{12}$ and the window $F_0$ receives the projection of the light $L_0$, thus indicating, for example, red. Whereupon, it indicates that the value "2" of the window $F_{12}$ corresponds to 2 seconds in the shutter speed. In this way, the low shutter speed from 2 seconds to 60 seconds may be discriminated and indicated by the same lot number on the high speed side when both the high speed indication lamp of the values of from "2" to "60" and simultaneously the overflow lamp are lighted. If another indication lamp is provided through the diode on the output in the indication circuit $I_1$, etc. on the high speed side similarly to the low speed side so that said lamp as described and the lamp $L_0$ are formed by a set of luminescent elements different in color so as to project the window $F_0$, the indication of the indication window $F_0$ may also be discriminated through the luminous color at the high speed side and the low speed side.

We claim:

1. A system for indicating shutter speeds of a camera comprising:
   a plurality of segments each having a coded integer, which represents both a first shutter speed equal in seconds to the integer and a second shutter speed equal in seconds to the reciprocal of the integer;
   a plurality of means each responsive to an indication signal for illuminating the coded integer of its associated one of said segments;
   means for representing that the integer, when illuminated, is indicative of the associated first shutter speed; and
   control circuitry including:
   a plurality of means for producing the indication signals to activate said plurality of illuminating means, at least one of said plurality of illuminating means being activated selectively by two of said plurality of indication signal producing means; and an additional circuit for activating said representing means, whereby the integer, when illuminated with said representing means, represents the associated first shutter speed, and, when illuminated without activating said representing means, represents the associated second shutter speed.

2. A system in accordance with claim 1, wherein said representing means comprises an overflow indicator.

3. A system in accordance with claim 2, wherein said plurality of segments are arranged in a finder field of the camera.

* * * * *

UNITED STATES PATENT AND TRADEMARK OFFICE
CERTIFICATE OF CORRECTION

PATENT NO. : 4,074,292
DATED : February 14, 1978
INVENTOR(S) : SOICHI NAKAMOTO, et al.

It is certified that error appears in the above-identified patent and that said Letters Patent are hereby corrected as shown below:

Column 2,
line 48, change "2" to -- a --; line 55, change "$I_1 - I_{n+a}$" to -- $I_1 - I_{n+1}$ --; line 56, change "$L_1 - L_{4+1}$" to -- $L_1 - L_{n+1}$ --.
    Column 3, line 42, change "1 inch" to -- 1" --.
    Column 4, line 29, before "in" delete -- of --.
    Column 6, line 5, change "claim 2" to -- claim 1 --.

Signed and Sealed this

Fifteenth Day of August 1978

[SEAL]

Attest:

RUTH C. MASON
*Attesting Officer*

DONALD W. BANNER
*Commissioner of Patents and Trademarks*